US011074409B2

(12) United States Patent
Shigabutdinov

(10) Patent No.: US 11,074,409 B2
(45) Date of Patent: Jul. 27, 2021

(54) SYSTEMS AND METHODS FOR PROCESSING INPUT STREAMS OF CALENDAR APPLICATIONS

(71) Applicant: Ruslan Shigabutdinov, Kazan (RU)

(72) Inventor: Ruslan Shigabutdinov, Kazan (RU)

(*) Notice: Subject to any disclaimer, the term of this patent is extended or adjusted under 35 U.S.C. 154(b) by 0 days.

(21) Appl. No.: 14/783,022

(22) PCT Filed: Apr. 10, 2013

(86) PCT No.: PCT/RU2013/000306
§ 371 (c)(1),
(2) Date: Oct. 7, 2015

(87) PCT Pub. No.: WO2014/168502
PCT Pub. Date: Oct. 16, 2014

(65) Prior Publication Data
US 2016/0055131 A1    Feb. 25, 2016

(51) Int. Cl.
*G06F 40/279* (2020.01)
*G06Q 10/10* (2012.01)
*G06F 40/205* (2020.01)

(52) U.S. Cl.
CPC .......... *G06F 40/279* (2020.01); *G06F 40/205* (2020.01); *G06Q 10/109* (2013.01)

(58) Field of Classification Search
CPC .... G06F 17/277; G06F 40/205; G06F 40/279; G06Q 10/109
See application file for complete search history.

(56) References Cited

U.S. PATENT DOCUMENTS 5,392,447 A * 2/1995 Schlack .............. G06F 15/0225
379/355.03
6,026,410 A * 2/2000 Allen ..................... G06Q 10/10
(Continued)

FOREIGN PATENT DOCUMENTS

CA      2745616 A1    1/2012
CN    101258517 A    9/2008
(Continued)

OTHER PUBLICATIONS

Aiken, Peter G. "Microsoft Outlook 2007 Bible", p. 260. Apr. 30, 2007, Wiley. (Year: 2007).*
(Continued)

*Primary Examiner* — Kavita Stanley
*Assistant Examiner* — Tyler Schallhorn
(74) *Attorney, Agent, or Firm* — Lowenstein Sandler LLP

(57) ABSTRACT

Systems and methods for processing input streams of calendar applications. An example method, performed by a computer system, may comprise receiving an input stream; processing the input stream to produce a sequence of characters; responsive to determining that the sequence of characters comprises a time reference, storing, in a memory, a calendar entry in a first data structure of a first type, the calendar entry comprising an identifier of a time referenced by the time reference; responsive to determining that the sequence of characters does not comprise a time reference, storing, in the memory, a memorandum in a second data structure of a second type, the memorandum comprising at least part of the sequence of characters.

20 Claims, 6 Drawing Sheets

(56) References Cited

U.S. PATENT DOCUMENTS

| | | | |
|---|---|---|---|
| 6,675,356 B1* | 1/2004 | Adler | G06Q 10/109 707/999.001 |
| 6,741,994 B1* | 5/2004 | Kang | G06F 17/3071 |
| 7,146,381 B1* | 12/2006 | Allen | G06F 17/2705 |
| 7,245,765 B2* | 7/2007 | Myers | G06K 9/228 382/181 |
| 7,596,269 B2* | 9/2009 | King | G06F 16/40 382/177 |
| 7,970,793 B2* | 6/2011 | Davia | G06Q 10/109 707/793 |
| 8,014,040 B2* | 9/2011 | Rosenfeld | H04N 1/00236 358/1.15 |
| 8,069,030 B2* | 11/2011 | Iso-Sipila | H04M 1/72563 704/3 |
| 8,115,948 B2* | 2/2012 | Rosenfeld | G06Q 10/109 358/1.15 |
| 8,239,375 B2* | 8/2012 | Bocking | G06F 17/30964 707/722 |
| 8,363,943 B2* | 1/2013 | Eklund | G06Q 10/109 382/181 |
| 8,370,763 B1* | 2/2013 | Moore | G06F 3/01 715/776 |
| 8,495,059 B2* | 7/2013 | Bocking | G06F 17/30964 707/722 |
| 8,868,427 B2* | 10/2014 | Rysenga | G06Q 10/109 340/521 |
| 9,009,592 B2* | 4/2015 | Friend | G06F 3/167 715/256 |
| 9,116,890 B2* | 8/2015 | King | G06F 16/434 |
| 9,223,479 B2* | 12/2015 | Deng | G06Q 10/109 |
| 9,436,649 B2* | 9/2016 | Meunier | G06F 15/16 |
| 9,514,134 B2* | 12/2016 | King | G06F 16/5846 |
| 9,633,013 B2* | 4/2017 | King | G06K 9/00449 |
| 9,760,644 B2* | 9/2017 | Khvostichenko | G06Q 10/00 |
| 10,007,897 B2* | 6/2018 | Possing | G06Q 10/109 |
| 10,872,316 B2* | 12/2020 | Siu | G06Q 10/109 |
| 2005/0041862 A1* | 2/2005 | Lo | G06K 9/2036 382/181 |
| 2005/0091095 A1 | 4/2005 | Ovenden | |
| 2005/0100216 A1* | 5/2005 | Myers | G06K 9/72 382/181 |
| 2005/0246640 A1* | 11/2005 | Lacy | G06F 3/0482 715/713 |
| 2006/0031326 A1 | 2/2006 | Wilbrink et al. | |
| 2006/0041828 A1* | 2/2006 | King | G06F 16/955 715/205 |
| 2006/0047644 A1* | 3/2006 | Bocking | G06F 17/30964 |
| 2007/0073530 A1* | 3/2007 | Iso-Sipila | G06F 9/454 704/3 |
| 2007/0083552 A1* | 4/2007 | Allen | G06F 17/2705 |
| 2007/0247665 A1* | 10/2007 | Rosenfeld | G06Q 10/109 358/1.18 |
| 2007/0247673 A1* | 10/2007 | Rosenfeld | H04N 1/00236 358/474 |
| 2007/0288279 A1* | 12/2007 | Haugen | G06Q 10/109 705/7.21 |
| 2008/0005168 A1* | 1/2008 | Huff | G06Q 10/109 |
| 2008/0140384 A1 | 6/2008 | Landau | |
| 2008/0175104 A1* | 7/2008 | Grieb | G06Q 10/109 368/29 |
| 2008/0243841 A1* | 10/2008 | Bonnet | G06F 17/2705 |
| 2008/0263087 A1* | 10/2008 | Eklund | G06Q 10/109 |
| 2009/0037843 A1 | 2/2009 | Dong et al. | |
| 2009/0055415 A1 | 2/2009 | Golds et al. | |
| 2009/0198728 A1* | 8/2009 | Davia | G06Q 10/109 |
| 2010/0103779 A1 | 4/2010 | Kakirde et al. | |
| 2010/0331043 A1* | 12/2010 | Chapman | G01C 21/20 455/556.1 |
| 2011/0141855 A1* | 6/2011 | Gault | G06Q 10/109 368/10 |
| 2011/0144980 A1* | 6/2011 | Rysenga | G06Q 10/109 704/201 |
| 2012/0035925 A1* | 2/2012 | Friend | G06F 3/167 704/235 |
| 2012/0083294 A1 | 4/2012 | Bray et al. | |
| 2012/0102415 A1* | 4/2012 | Deng | G06Q 10/109 715/753 |
| 2012/0265753 A1* | 10/2012 | Bocking | G06F 17/30964 707/722 |
| 2012/0278408 A1* | 11/2012 | Seferian | G06Q 10/1095 709/206 |
| 2012/0317219 A1 | 12/2012 | Carroll et al. | |
| 2013/0050533 A1 | 2/2013 | Park et al. | |
| 2013/0073662 A1* | 3/2013 | Meunier | G06Q 10/107 709/206 |
| 2013/0117059 A1* | 5/2013 | Norton | G06Q 10/1093 705/7.18 |
| 2013/0205225 A1* | 8/2013 | Deng | G06Q 10/109 715/751 |
| 2013/0212492 A1* | 8/2013 | Chen | G06F 3/0484 715/753 |
| 2013/0218870 A1* | 8/2013 | Bukurak | G06F 17/30864 707/722 |
| 2014/0146200 A1* | 5/2014 | Scott | G06K 9/00449 348/231.99 |
| 2014/0294302 A1* | 10/2014 | King | G06K 9/344 382/177 |
| 2014/0337751 A1* | 11/2014 | Lim | G06F 40/279 715/744 |
| 2014/0344745 A1* | 11/2014 | Possing | G06Q 10/109 715/772 |
| 2015/0193391 A1* | 7/2015 | Khvostichenko | G06F 40/279 715/205 |
| 2015/0193392 A1* | 7/2015 | Greenblatt | G06Q 10/109 715/205 |
| 2015/0254518 A1* | 9/2015 | Griffin | H04M 1/72552 382/229 |
| 2018/0114193 A1* | 4/2018 | Kwak | G06Q 10/0631 |
| 2018/0240070 A1* | 8/2018 | Siu | G06Q 10/109 |
| 2019/0122526 A1* | 4/2019 | Agnihotri | G06F 40/205 |
| 2020/0042621 A1* | 2/2020 | Frank | G06F 40/205 |

FOREIGN PATENT DOCUMENTS

| | | | | |
|---|---|---|---|---|
| CN | 101589427 A | 11/2009 | | |
| CN | 102945074 A | 2/2013 | | |
| CN | 102947787 A | 2/2013 | | |
| EP | 2362327 A1 * | 8/2011 | | G06K 9/2054 |
| JP | 2000222522 A | 8/2000 | | |
| JP | 2001084228 A | 3/2001 | | |
| JP | 2002215541 A | 8/2002 | | |
| JP | 2002297847 A | 10/2002 | | |
| JP | 2003044415 A | 2/2003 | | |
| JP | 2004046325 A | 2/2004 | | |
| JP | 2006113956 A | 4/2006 | | |
| JP | 2006222727 A | 8/2006 | | |
| JP | 2009218771 A | 9/2009 | | |
| JP | 2010040027 A | 2/2010 | | |
| JP | 2011128927 A | 6/2011 | | |
| KR | 1020060075986 A | 7/2006 | | |
| RU | 2392663 C2 | 6/2010 | | |
| RU | 2439655 C2 | 1/2012 | | |
| WO | 2006095053 A2 | 9/2006 | | |
| WO | 2007130266 A1 | 11/2007 | | |
| WO | 2014168502 A1 | 10/2014 | | |

OTHER PUBLICATIONS

Desruisseax, B. et al. RFC 5455: Internet Calendaring and Scheduling Core Object Specification (iCalendar), Sep. 2009 IETF. Retrieved from: <https://tools.ietf.org/pdf/rfc5545> (Year: 2009).*

Fatiha Bousbahi, "From Poster to Mobile Calendar: An Event Reminder using Mobile OCR" International Journal of Advanced Computer Science and Applications(IJACSA), 10(10), 2019. http://dx.doi.org/10.14569/IJACSA.2019.0101075 (Year: 2019).*

Breuel, Thomas M., "The OCRopus open source OCR system", Optical Sensing II, vol. 6815, Jan. 27, 2008, 16 pages.

(56) References Cited

OTHER PUBLICATIONS

Extended European Search Report for European Patent Application No. 13881529.5, dated Sep. 15, 2016, 9 pages.
International Application No. PCT/RU2013/000306 International Preliminary Report on Patentablity dated Aug. 7, 2015, 4 pages.
International Application No. PCT/RU2013/000306 International Search Report dated Jan. 16, 2014.
Search Report for Russian Application No. 2015143049/08(066427), 2 pages, dated Apr. 24, 2017.
Decision on Grant for Russian Application No. 2015143049/08(066427), 7 pages, dated Oct. 24, 2017.
Chinese Office Action for CN Patent Application No. 201380075567.9, dated May 22, 2017, 18 pages.
Korean OA for Korean Patent Application No. (PCT) 10-2015-7031964, dated Oct. 22, 2018, 7 pages.
JP Office Action for JP Application No. 2017144264, dated Apr. 2, 2018, 8 pages.
JP Final Office Action for JP Application No. 2017144264, dated Oct. 1, 2018, 8 pages.
Korean OA for Korean Patent Application No. (PCT) 10-2015-7031964, dated Apr. 29, 2019.
Korean OA for Korean Patent Application No. (PCT) 10-2015-7031964, dated Jun. 28, 2019.
JP Office Action for JP Application No. 2016-507511, dated Dec. 26, 2016.
CA Office Action for CA Application No. 2,909,155, dated Dec. 20, 2018.
CA Office Action for CA App No. 2,909,155, dated Nov. 16, 2020.
BR Office Action for Brazilian Patent Application No. 1120150256368, dated Feb. 11, 2020.
IN Examination Report for Indian Application No. 6937/CHENP/2015, dated May 28, 2020.
Kumiko Ohsawa, "Data Management in Time Series and Its Applications, Multimedia, Distribution, Cooperation and Mobile (DICOMO 2009)", Proceedings of the Symposium, Symposium Series of the Information Processing Society of Japan, vol. 2009, No. 1 [CD-ROM] IPSJ Symposium Series, Japan, Information Processing Society of Japan, Jul. 16, 2009, pp. 44-46 (Newly added publication; Publication showing well-known technology).

* cited by examiner

210 Calendar entry data structure

| 211 Type ID |
|---|
| 212 Event ID |
| 214 Event Time |
| 216 Title |
| 218 Description |
| 220 Location |
| 222 Initiator |
| 224 Participants |
| 226 Recurring schedule |
| 228 Attachment |

240 Memorandum data structure

| 241 Type ID |
|---|
| 242 Memorandum ID |
| 244 Creation/modification time |
| 246 Title |
| 248 Text |
| 250 Attachment |

Fig. 2

SYSTEMS AND METHODS FOR PROCESSING INPUT STREAMS OF CALENDAR APPLICATIONS

CROSS-REFERENCE TO RELATED APPLICATIONS

This is a national phase application filed under 35 U.S.C. § 371 as a national stage of PCT/RU2013/000306, titled "Systems and Methods for Processing Input Streams of Calendar Applications," filed Apr. 10, 2013, the content of which is hereby incorporated by reference in its entirety.

TECHNICAL FIELD

The present disclosure is generally related to computer systems, and is more specifically related to systems and methods for processing heterogeneous input streams of calendar applications.

BACKGROUND

Calendar applications may be employed to facilitate event scheduling and tracking for individual users and/or groups of users. A calendar application may be executed by a computer system comprising one or more server computers and/or one or more client devices.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 schematically illustrates several data structures supported by the computer system executing a calendar application in accordance with one or more aspects of the present disclosure;

DETAILED DESCRIPTION

Described herein are methods and systems for processing heterogeneous input streams of calendar applications. A "calendar application" herein shall refer to an application facilitating event scheduling and tracking for individual users and/or groups of users.

Calendar applications described herein may be executed by computer systems comprising one or more computing devices, including servers and client devices, which may be interconnected over one or more networks. Users may access a calendar application by various client computing devices, including, e.g., personal computers and mobile devices, such as smart phones. A client device may input information over a variety of interfaces, including, e.g., a keyboard, a touch screen, a network interface, a microphone, a video camera, a still image camera, and/or a microphone. Hence, an input stream of a calendar application may be represented, e.g., by a text stream, one or more still images, a video stream, and/or an audio stream. A computer system executing a calendar application may convert non-textual inputs into text (e.g., image to text conversion using optical character recognition (OCR) methods, voice into text conversion, etc.).

In certain implementations, a computer system executing a calendar application may process one or more input streams to produce calendar entries and non-calendar textual items (memorandums). The computer system may then render, on a client device, calendar entries and memorandums via various views, including, e.g., calendar view and notebook view. Various aspects of the above referenced systems and methods are described in details herein below by way of examples, rather than by way of limitation.

Figure 1:
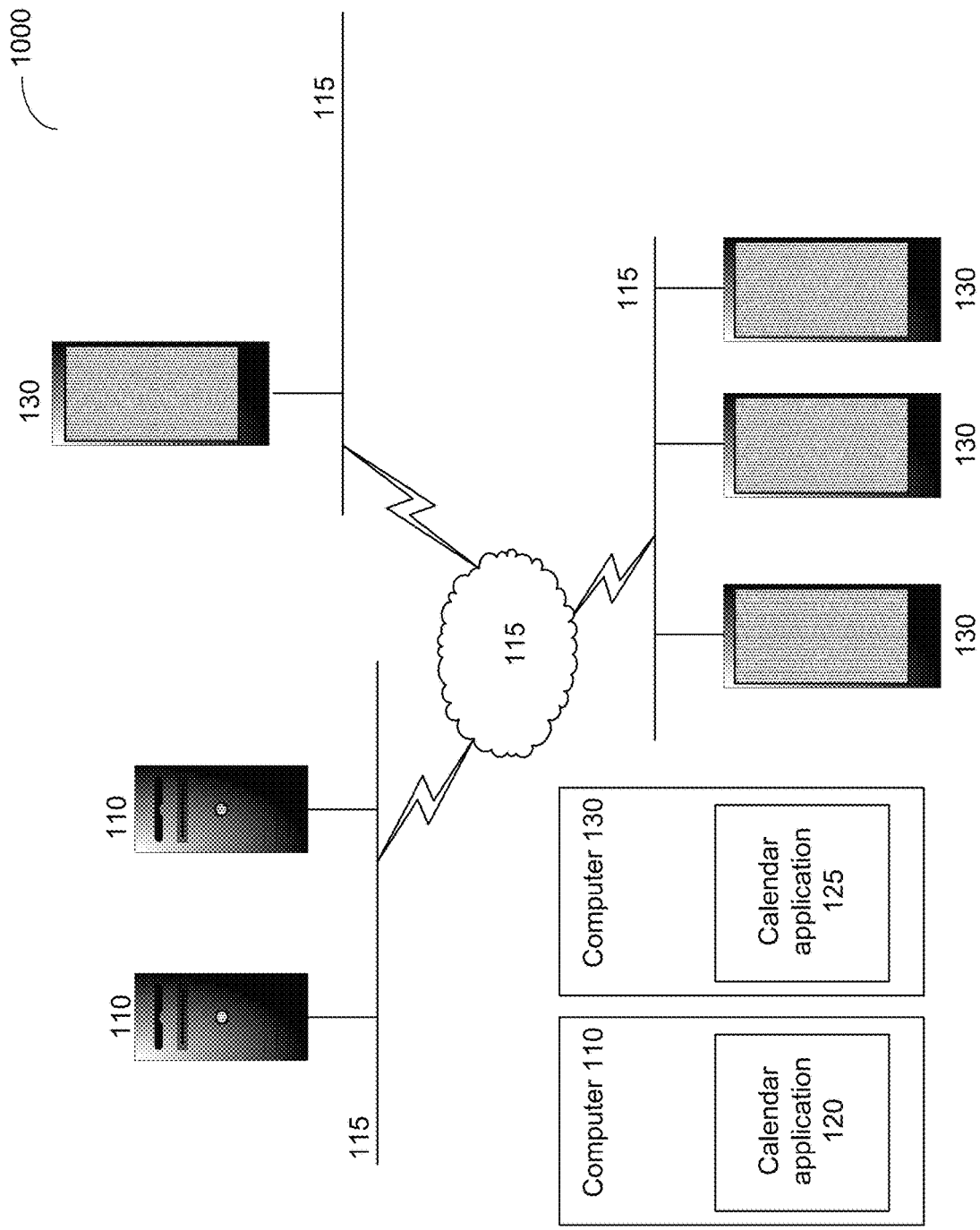
FIG. 1 depicts a network-level diagram of one illustrative embodiment of a computer system executing a calendar application in accordance with one or more aspects of the present disclosure.

FIG. 1 depicts a network-level diagram of one illustrative embodiment of a computer system 1000 in accordance with one or more aspects of the present disclosure. The computer system 1000 may comprise one or more servers 110 executing server-side portions 120 of a calendar application. One or more client computers 130 executing client-side portions 125 of the calendar application may be connected to the server computer 110 over a plurality of interconnecting networks 115. A "computer" herein shall refer to an apparatus including a processor, a memory, and at least one input/output (I/O) interface. A computer may be represented, e.g., by a server, a virtual machine running on a host computer system, a portable or desktop personal computer (PC), a tablet computer, or a smartphone. Further, the term "computer" shall include any collection of computers that individually or jointly execute a set (or multiple sets) of instructions to perform any one or more of the methods described herein.

A "network" herein shall refer to a distributed communication system interconnecting two or more computers. A network may be represented, e.g., by a local area network (LAN), a wide area network (WAN), or a virtual private network (VPN). In certain implementations, the plurality of interconnecting networks 115 may include the Internet.

Functions of the computer system 1000 may be delivered to an end user via one or more client devices 130, such as, for example, a portable or desktop personal computer (PC), a tablet computer, or a smartphone. In one example, one or more client devices 130 may provide user interface functions and communicate to one or more servers 110 which may perform client request processing, load balancing, client authentication, authorization, calendar entry storage and retrieval, billing, and other functions. These and other functions may be distributed among one or more servers 110 residing in one or more physical facilities.

In another example, at least some of the above listed server-side functions may be performed by one or more client devices 130. In certain implementations, a client device 130 may perform at least a subset of its functions while not being connected to a server 110. This processing mode is also referred to as the offline client operational mode.

Some of the above listed functions, such as, for example, client request processing, load balancing, client authentication, authorization, calendar entry storage and retrieval, and/or billing, may be referred to as pertaining to the server-side functionality. Other functions, such as, for example, accepting user input and/or rendering information in calendar and/or notebook views, may be referred to as pertaining to the client-side functionality. However, in certain implementations, the calendar system 1000 may include one or more computers performing at least some of the server-side functionality pertaining to the server-side functionality and at least some of the functions pertaining to the client-side functionality. Hence, the client-side and server-side functionality designation as may be referenced herein is intended for illustration purposes having no bearing on operation of the components of the computer system 1000.

In one example, the computer system 1000 may support a data model comprising calendar entries and memorandums, as schematically illustrated by FIG. 2. A calendar entry may be represented by a data structure 210 comprising an identifier 212 and a time 214. In certain implementations, the identifier 212 may be provided by a human readable sequence of alphanumeric characters comprising a title and/or description of a calendar entry. Alternatively, the calendar entry identifier may be provided by an alphanumeric or non-alphanumeric identifier which is not intended to be human-readable.

In certain implementations, the time 214 may be represented by a start time of an event identified by the calendar entry and duration of the event. Alternatively, the time 214 may be represented by a start time and end time of the event. The start time and/or end time of the event may be represented by a date (e.g., comprising a day, a month, and a year) and time of day (e.g., comprising an hour, a minute, and a second). The time 214 may further comprise a time zone identifier.

The data structure 210 may further comprise a calendar entry title 216, description 218, location 220, an identifier of an initiator 222 of the event identified by the calendar entry, a list of participants 224 of the event, recurring schedule 226, and/or other fields. In certain implementations, the data structure 210 may comprise a type identifier 211 of the calendar entry. Examples of calendar entries represented by the data structure 210 may include appointments, meeting requests, reminders, etc. In certain implementations, the data structure 210 may comprise one or more pointers 228 to data sets which may be referred to as attachments. In one example, an attachment may be provided by a file of an arbitrary type, such as text, audio stream, video stream, still image, etc.

A memorandum may be represented by a data structure 240 comprising a memorandum text 248. In certain implementations, the data structure 240 may further comprise a type identifier 241, a memorandum identifier 242, the time of creation and/or modification 244 of the memorandum, and/or a title 246 of the memorandum. The time 244 may be represented by a date (e.g., comprising a day, a month, and a year) and time of day (e.g., comprising an hour, a minute, and a second). The time 244 may further comprise a time zone identifier.

In certain implementations, the data structure 240 may comprise one or more pointers 250 to data sets which may be referred to as attachments. In one example, an attachment may be provided by a file of an arbitrary type, such as text, audio stream, video stream, still image, etc.

In certain implementations, the computer system 1000 may store the above described data structures in a relational database residing on one or more computers, including one or more servers 110 and/or one or more client devices 130. In certain implementations, other methods of storing the above described data model, including, e.g., a hierarchical database, or one or more flat files, may be employed by the computer system 1000 for storing the calendar data according to the above described data model.

In certain implementations, the computer system 1000 may store a user directory associated with the calendar system in a directory server, such as a Lightweight Directory Access Protocol (LDAP) server. In certain implementations, other methods of storing the user directory, including, e.g., a native user directory provided by the operating system of a server 110, may be employed by the computer system 1000.

The computer system 1000 executing a calendar application may accept one or more input streams via one or more input interfaces of a client device 130. In one example, the computer system 1000 may accept, via a keyboard and/or a touchscreen of a client device 130, a user input of a text comprising a sequence of alphanumeric and non-alphanumeric characters. In another example, the computer system 1000 may accept, via a microphone of the client device 130, a voice stream, and then convert the voice input into a text. In a further example, the computer system 1000 may accept, via a video camera of the client device 130, a video stream, and then convert the video stream into a text. In a further example, the computer system 1000 may acquire, via an imaging device, an image of an object focused onto by the imaging lens of the imaging device, and then convert the image into a text. In certain implementations, the computer system 1000 may receive inputs of any of the above listed or other types via a network interface.

The computer system 1000 may then process the input stream to produce a sequence of characters representing an input item, such as a calendar entry or a memorandum. In certain implementations, the inputted text may be split into two or more input items based on one or more pre-defined characters found in the text. For example, a divider indicating a boundary of an input item may be represented by a punctuation character, such as a comma (.). In another example, a divider may be represented by two or more characters, such as a comma followed by a "new line" control character, two consecutive commas, or two consecutive "new line" control characters.

In certain implementations, the input stream may be split into two or more input items before converting those items into a text. In one example, a video stream containing images of objects bearing handwritten and/or typed text may be split into two or more input items, each item containing an image of one text bearing object. In another example, a still image of a text bearing object may be split into two or more images based on two or more distinctive graphical dividers found within the image, such as lines or shapes visually dividing the text into several portions. In a further example, an audio stream may be split into two or more portions based on two or more distinctive audio dividers found within the audio stream (e.g., a pre-defined sound, including audible and non-audible sounds; a pre-defined phrase; or a silent fragment having a duration exceeding a pre-defined threshold).

The computer system 1000 may then parse the input item to determine whether the input item contains a time reference, and hence whether the input item may be classified as representing a calendar entry or a memorandum. The computer system 1000 may employ various methods of parsing the input item. In one example, the computer system 1000 may store one or more time formats, such as, for example, MM/DD/YY, MM/DD/YYYY, and/or MM/DD/YYYY hh:mm:ss. Each format string may include one or more text fields and one or more separator symbols. A text field may be designated to store a defined number of characters from a pre-defined alphabet, and may represent a pre-defined part of a date and/or time (e.g., MM field may store two digits and may represent a month). Responsive to establishing that a portion of an inputted text matches a pre-defined time format, the computer system 1000 may decode the time reference based on the identified format, and store the time reference in a time data structure.

In one example, the time data structure may comprise a date (e.g., including a day, a month, and a year) and time of day (e.g., including an hour, a minute, and a second). Alternatively, the time data structure may be represented by a POSIX-style time variable comprising an integer field containing a number of seconds elapsed since a pre-defined time in the past (e.g., midnight 1 Jan. 1970). In certain implementations, the time data structure may further comprise a time zone identifier. Alternatively, all time values may be stored by the computer system 1000 in a pre-defined time zone, such as, for example, Universal Coordinated Time (UTC).

In one example, the computer system 1000 may detect relative time references represented by one or more pre-defined lexemes indicating a day relative to the current time, such as, e.g., today, tomorrow, etc. In another example, the computer system 1000 may recognize relative time references which may be represented by one or more pre-defined lexemes indicating a time of day, such as, e.g., morning, afternoon, evening, night, etc. In another example, the computer system 1000 may recognize relative time references which may be represented by or more pre-defined lexemes indicating a day of week, such as, e.g., Sunday, Monday, Tuesday, etc.

In certain implementations, the computer system 1000 may convert an imprecise relative textual time reference into a time data structure, by applying one or more pre-defined conversion rules and/or configuration parameters mapping imprecise time references to times, such as, for example, "after lunch," "close of business," "end of day," etc.

In certain implementations, the computer system 1000 may recognize one or more natural languages being used in the input stream. Alternatively, one or more the natural languages to be used in the input stream may be specified as configuration parameters of the computer system 1000.

As noted herein above, responsive to determining that an input item comprises a time reference, the computer system 1000 may classify the input item as representing a calendar entry, and store in the calendar entry data structure the time identified by the time reference along with zero or more optional fields, as described in more details herein below. Responsive to determining that an input item does not comprise a time reference, the computer system 1000 may classify the input item as representing a memorandum, and store in the memorandum data structure at least part of the text of the input item, along with other optional fields, including the current time and one or more pointers to attachments.

In certain implementations, the computer system 1000 may process the input item designated as a representing calendar entry to extract one or more calendar entry elements, such as, for example, a type identifier, a title, a description, a location of the event identified by the calendar entry, an initiator of the event, a list of participants of the event, recurring schedule of the event, and/or one or more attachments.

The type identifier field may be represented by a numeric or string value identifying the type of the calendar entry, for example, appointment, meeting request, reminder, etc. The title filed may be represented by an alphanumeric string containing a human readable identifier of the event referenced by the calendar entry, such as, for example "Project status meeting," "Working lunch," etc. The description filed may be represented by an alpha-numeric string containing human readable information related to the event, such as, e.g., a meeting agenda. The location filed may be represented by an alphanumeric string containing a human readable description of the event location, such as, for example, "Conference Room 100." In certain implementations, the location field may be represented by an identifier of a data structure in an external system, such as an office space management system. The event initiator field may be represented by an alphanumeric string containing an identifier of the person initiating the event (such as, for example, the meeting chair). In certain implementations, the event initiator field may be represented by an identifier of a data structure in an external system, such as a user directory (e.g., an LDAP directory). The list of participants may be represented by a list of alphanumeric strings containing identifiers of participants of the event (such as, for example, the meeting attendees). In certain implementations, an event participant identifier may be represented by an identifier of a data structure in an external system, such as a user directory (e.g., an LDAP directory). The recurring schedule field may be represented by a list of dates and times of the event, and/or one or more recurrence attribute (e.g., weekly, monthly, etc.). An attachment may be provided by a file of an arbitrary type, such as text, audio stream, video stream, still image, etc.

Upon receiving a user interface command, the computer system 1000 may render, on a client device, one or more calendar entries and/or memorandums via various views, including, e.g., calendar view and notebook view.

Figure 3A:
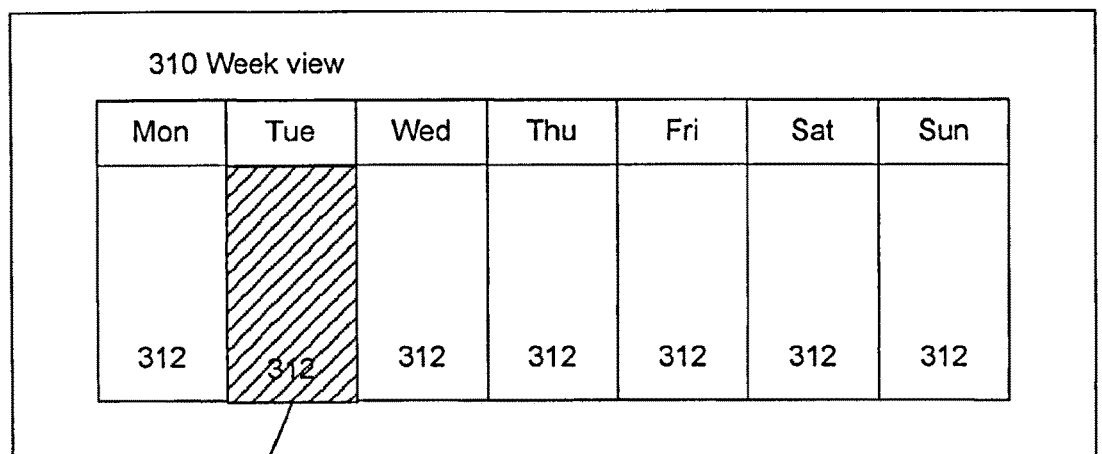
FIGS. 3a-3b schematically illustrate examples of calendar views rendered by the computer system executing a calendar application in accordance with one or more aspects of the present disclosure.
Figure 3B:
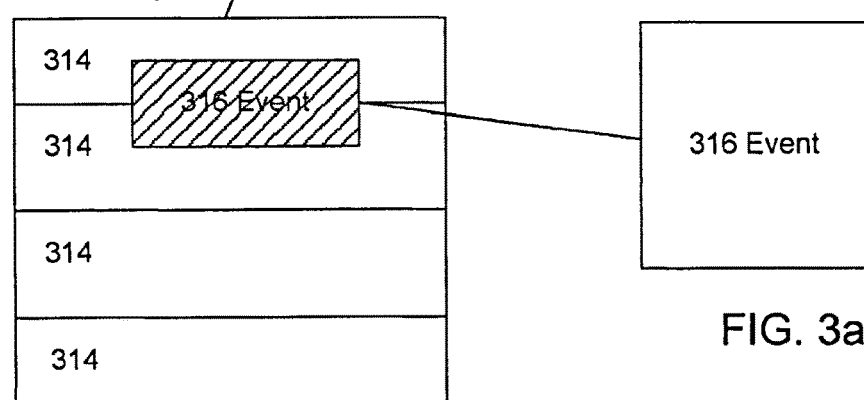
Figure 3B:
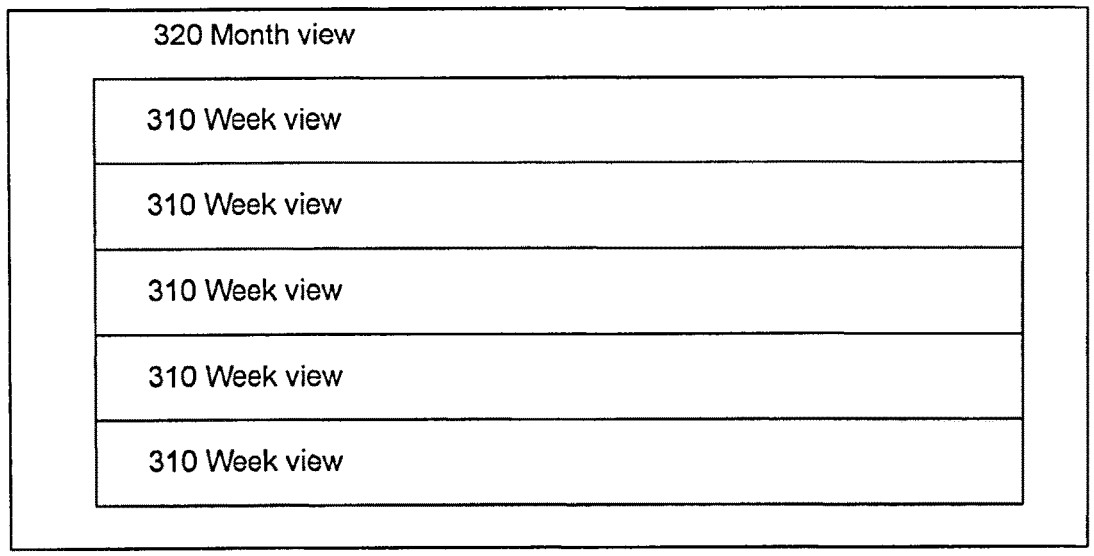

The calendar view may comprise one or more calendar entries rendered on a screen with visual references to one or more time indicators. In one example, as schematically illustrated by FIG. 3a, the calendar view 300 may comprise one or more week views 310. The week view 310 may comprise up to seven visually distinct screen areas corresponding to days of the week (day views 312). Each day view may be visually divided into several screen areas 314 corresponding to time of day. One or more time of day values may be placed within a day view. One or more calendar entries 316 may be shown within a day view 312. In another example, as schematically illustrated by FIG. 3b, the calendar view 300 may comprise one or more month views 320. The month view 320 may comprise a plurality of week views 310. The week view 310 may comprise up to seven visually distinct screen areas corresponding to days of the week (day views 312). Each day view may be visually divided into several screen areas 314 corresponding to time of day. One or more time of day values may be placed within a day view. One or more calendar entries 316 may be shown within a day view 312. In a further example, the calendar view may comprise quarter view, year view, and/or other views.

Figure 4A:
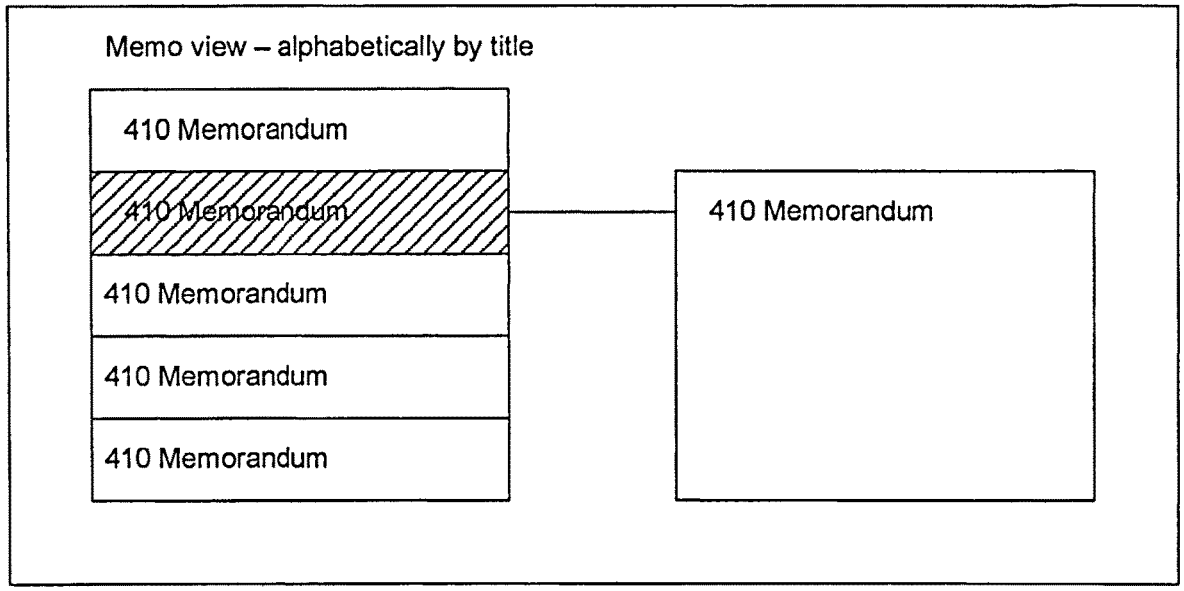
FIGS. 4a-4b schematically illustrate examples of notebook views rendered by the computer system executing a calendar application in accordance with one or more aspects of the present disclosure.
Figure 4B:
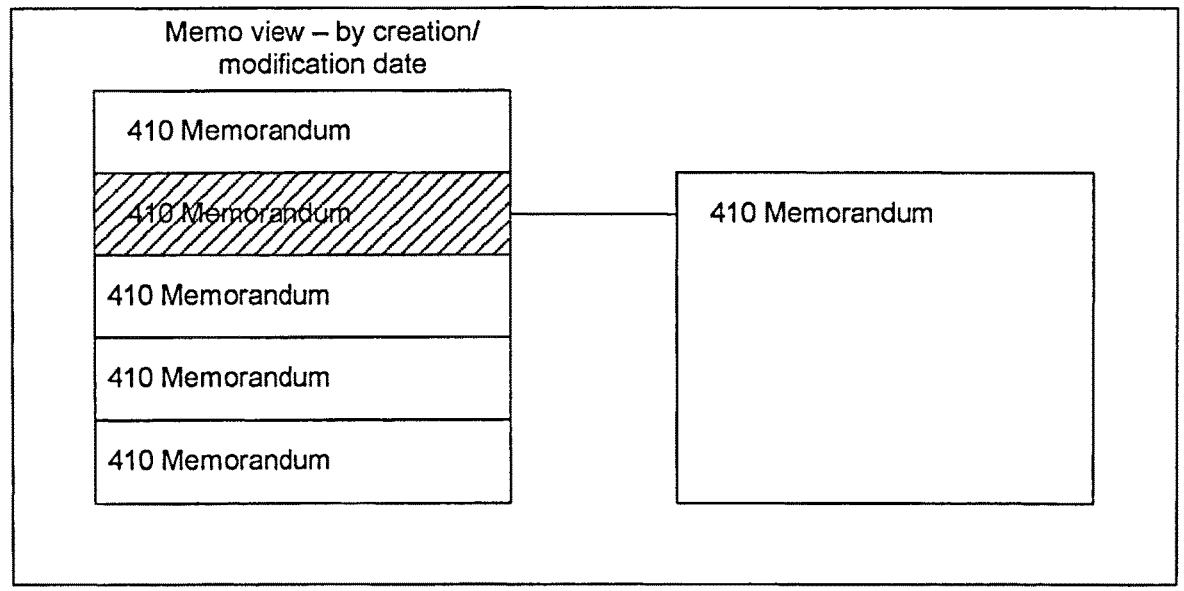

The notebook view may comprise one or more memorandums rendered on a screen. In one example, as schematically illustrated by FIG. 4a, one or more memorandums 410 rendered within the notebook view 400 may be sorted alphabetically by title/subject. In another example, as schematically illustrated by FIG. 4b, one or more memorandums rendered within the notebook view 400 may be sorted chronologically by the date of time of creation or modification of the memorandum.

In certain implementations, the computer system 1000 may render one or more calendar event and one or more memorandums in a mixed view, e.g., selecting and/or sorting calendar events and memorandums by title, keyword, author, and/or date and time of creation or modification of the calendar event or the memorandum.

In certain implementations, the computer system 1000 may accept a user input editing an existing calendar entry or an existing memorandum. In one example, responsive to accepting a user input editing a memorandum, the computer system 1000 may determine that the newly added text comprises a time reference. Following such a determination, the computer system 1000 may convert the memorandum into a calendar entry, and store in the calendar entry data structure the time identified by the time reference along with zero or more optional fields, as described in more details herein above.

Figure 5:
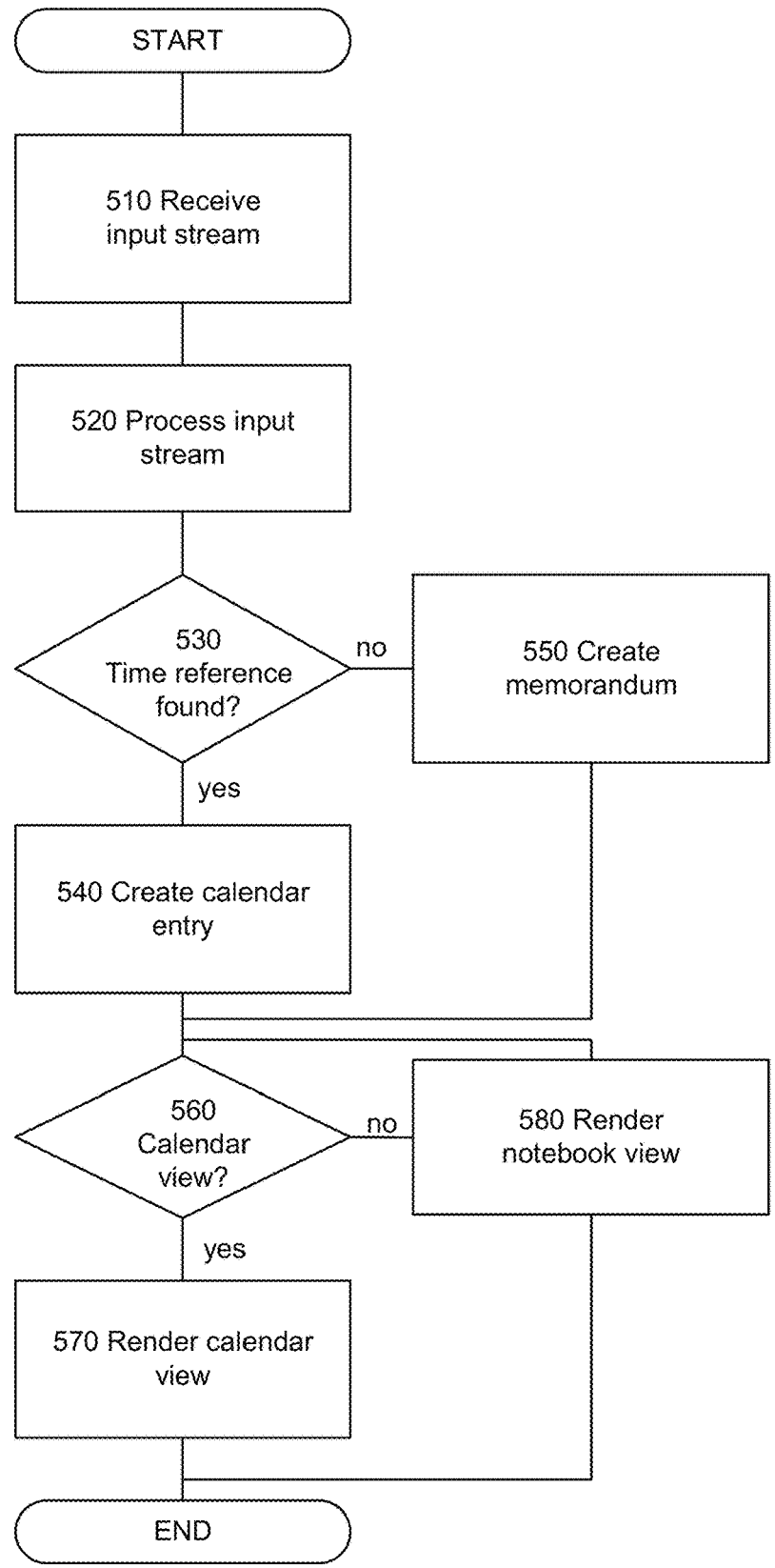
FIG. 5 depicts a flow diagram of a method for processing inputs of calendar applications, in accordance with one or more aspects of the present disclosure.

FIG. 5 depicts a flow diagram of one embodiment of a method 500 for processing input streams of calendar applications. The method 500 may be performed by a computer system that may comprise hardware (e.g., circuitry, dedicated logic, and/or programmable logic), software (e.g., instructions executable on a computer system to perform hardware simulation), or a combination thereof. The method 500 and/or each of its individual functions, routines, subroutines, or operations may be performed by one or more physical processors of the computer system executing the method. Two or more functions, routines, subroutines, or operations of the method 500 may be performed in parallel or in an order which may differ from the order described above.

The processing may commence by the computer system receiving, at block 510, an input stream via one or more input interfaces of a client device. In one example, the computer system may accept, via a keyboard and/or a touchscreen of a client device, a user input of a text comprising a sequence of alphanumeric and non-alphanumeric characters. In another example, the computer system may accept, via a microphone of the client device, a voice stream. In a further example, the computer system may accept, via a video camera of the client device, a video stream. In a further example, the computer system may acquire, via an imaging device, an image of an object focused onto by the imaging lens of the imaging device. In certain implementations, the computer system may receive inputs of any of the above listed or other types via a network interface.

At block 520, the computer system may process the input stream to produce a sequence of characters representing an input item, such as a calendar entry or a memorandum. As noted herein above, one or more non-textual input streams may be converted into text. The input stream may be split into two or more input items, based on one or more pre-defined textual, graphical, and/or other type of divider.

Responsive to determining, at block 530, that the input item comprises a time reference, the computer system may continue processing at block 540; otherwise, the method may branch to block 550.

At block 540, the computer system may create and store in its memory a new calendar entry using a calendar entry data structure. The calendar entry may comprise an identifier of a time referenced by the time reference. In certain implementations, the computer system may further process the input item designated as representing a calendar entry to extract one or more elements, such as, for example, a type identifier, a title, a description, a location of the event identified by the calendar entry, an initiator of the event, a list of participants of the event, recurring schedule of the event, and/or one or more attachments, as described in more details herein above.

At block 550, the computer system may create and store its memory a new memorandum using a memorandum data structure. The memorandum may comprise at least part of the input item text. In certain implementations, the computer system may further process the input item designated as representing a memorandum to extract one or more elements, such as, for example, a title, a subject, and/or one or more attachments, as described in more details herein above.

At block 560, the computer system may receive a user input selecting a calendar view or a notebook view for rendering one or more calendar entries or memorandums.

At block 570, the computer system may render a calendar view, as described in more details herein above. At block 580, the computer system may render a notebook view, as described in more details herein above. Responsive to completing the operations references by blocks 570 or 580, the method may terminate.

Figure 6:
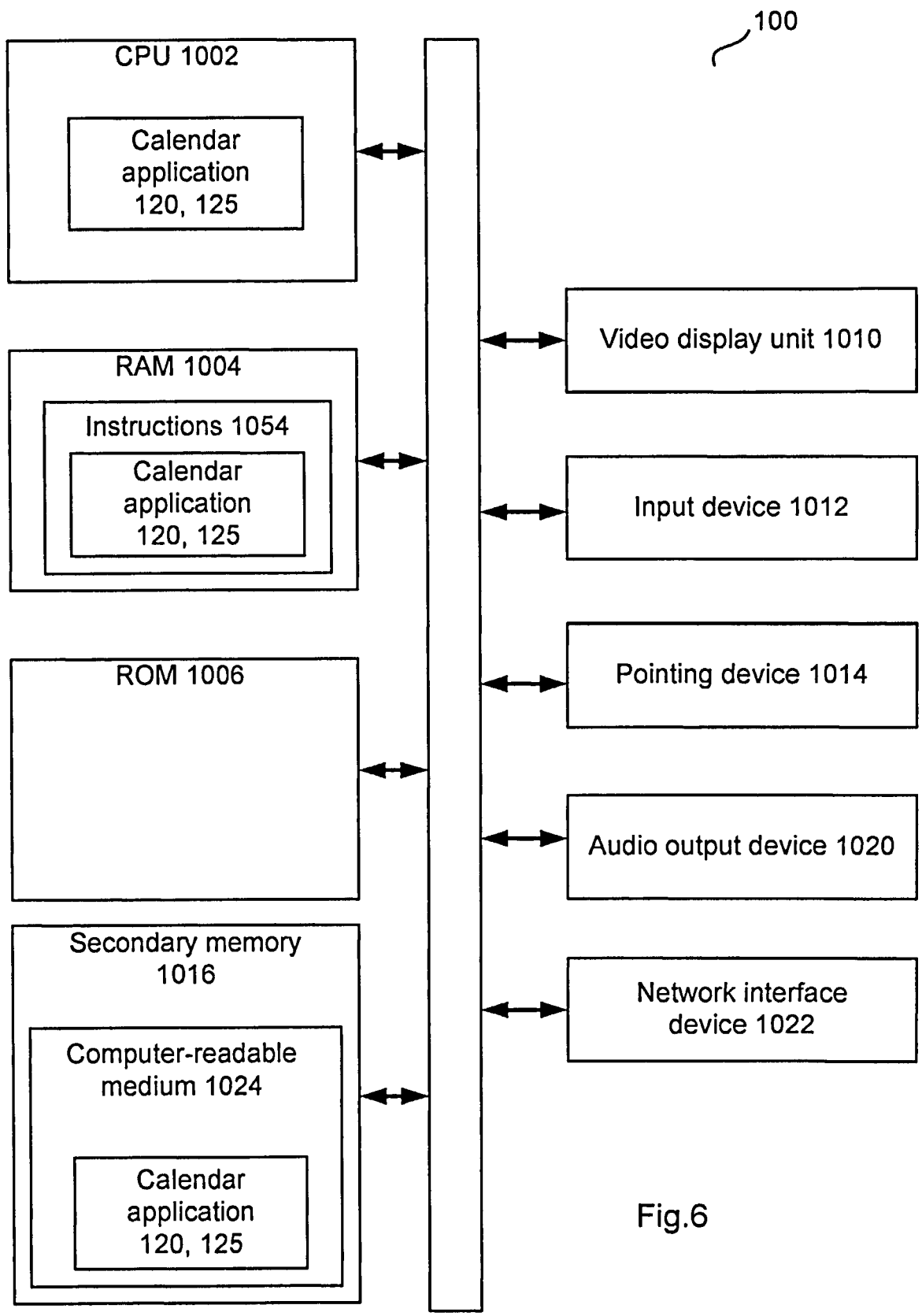
FIG. 6 depicts a block diagram of an illustrative computer system operating in accordance with examples of the present disclosure.

FIG. 6 depicts an example computer system 100 capable of executing instructions causing the computer to perform one or more of the methods described herein. In certain embodiments, the computer system 100 may correspond to one or more servers 110 and/or client devices of FIG. 1.

In certain embodiments, the computer system 100 may be connected (e.g., via a network, such as a Local Area Network (LAN), an intranet, an extranet, or the Internet) to other computer systems. The computer system 100 may operate in the capacity of a server or a client computer in a client-server environment, or as a peer computer in a peer-to-peer or distributed network environment. The computer system 100 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device.

In a further aspect, the computer system 100 may include a processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008. The processor 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 100 may further include a network interface device 1022. The computer system 100 also may include a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may include a non-transitory computer-readable storage medium 1024 on which may be stored instructions of the calendar application 120, 125. Instructions of the calendar application 120, 125 may also reside, completely or partially, within the main memory 1004 and/or within the processor 1002 during execution thereof by the computer system 1000, hence, the main memory 1004 and the processor 1002 may also constitute machine-readable storage media. While the computer-readable storage medium 1024 is shown in the illustrative embodiment as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulate and transform data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method functions, routines, subroutines, or operations. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

The invention claimed is:

1. A method, comprising:
receiving, by an image capturing device of a computer system, an input image, wherein the image capturing device is provided by one of: a still image camera or a video camera;
processing the input image to produce a first sequence of characters of a natural language, wherein the natural language is specified by a configuration parameter of the computer system;
responsive to determining that the first sequence of characters comprises no time references, storing, in a in a first data structure of a first type, a memorandum comprising at least part of the first sequence of characters;
receiving a user input modifying the memorandum;
processing the user input to produce a second sequence of characters;
responsive to determining that the second sequence of characters comprises an imprecise relative time reference, converting the memorandum stored in the first data structure of the first type into a calendar entry stored in a second data structure of a second type;
converting, by applying one or more pre-defined conversion rules, the imprecise relative time reference into an absolute time reference;
storing, in the second data structure of the second type, an identifier of a time referenced by the absolute time reference;
storing, in the second data structure, an identifier of an event and an identifier of a location of the event, wherein the identifier of the location is provided by a reference to a record in an office space management system;
parsing the second sequence of characters to produce a data item representing a type identifier of the calendar entry, wherein the type identifier is provided by one of: an appointment, a meeting request, or a reminder; and
rendering at least part of the first data structure and at least part of the second data structure in a mixed view showing calendar entries and memorandums.

2. The method of claim 1, further comprising storing a pointer to an attachment in at least one of: the first data structure or the second data structure.

3. The method of claim 1, further comprising storing a current time in at least one of: the first data structure or the second data structure.

4. The method of claim 1, wherein the absolute time reference comprises at least one of: a date, an hour, a minute, a second, or a time zone identifier.

5. The method of claim 1, wherein the absolute time reference identifies at least one of: a start time of an event identified by the calendar entry, an end time of the event identified by the calendar entry, or a duration of the event identified by the calendar entry.

6. The method of claim 1, wherein the rendering comprises rendering at least part of the second data structure with a visual reference to a time indicator.

7. The method of claim 1, further comprising:
splitting the input image into two or more input items based on a graphic divider visually dividing the input image.

8. The method of claim 1, wherein the second data structure comprises at least one of: a time of the event, a title of the event, a description of the event, an initiator of the event, a list of participants of the event, or a recurring schedule of the event.

9. The method of claim 1, wherein the second data structure comprises a start time of an event, an end time of the event, and a timezone identifier.

10. The method of claim 1, wherein the second data structure comprises an identifier of a participant of an event, wherein the identifier of the participant references a data structure in a user directory.

11. The method of claim 1, wherein the second data structure comprises an identifier of an initiator of an event, wherein the identifier of the initiator references a data structure in a user directory.

12. The method of claim 1, wherein the first data structure comprises at least one of: an identifier of a memorandum, a creation time of the memorandum, a modification time of the memorandum, a title of the memorandum, or a text of the memorandum.

13. The method of claim 1, wherein the imprecise relative time reference is relative to a specified event.

14. The method of claim 1, wherein processing the input image to produce a first sequence of characters further comprises:
recognizing one or more natural languages used in the input image.

15. The method of claim 1, wherein the calendar entries and the memorandums are sorted by respective titles of the calendar entries and the memorandums.

16. The method of claim 1, wherein the calendar entries and the memorandums are sorted by respective modification times of the calendar entries and the memorandums.

17. The method of claim 1, further comprising:
splitting the first sequence of characters into two or more input items based on a pre-defined combination of a punctuation character and a control character.

18. A system comprising:
a memory;
an image capturing device provided by one of: a still image camera or a video camera; and
a processor coupled to the memory and to the image capturing device, the processor configured to:
receive, by the image capturing device, an input image;
process the input image to produce a first sequence of characters of a natural language, wherein the natural language is specified by a configuration parameter of the computer system;
responsive to determining that the first sequence of characters comprises no time references, store, in a first data structure of a first type, a memorandum comprising at least part of the first sequence of characters;
receive a user input modifying the memorandum;
process the user input to produce a second sequence of characters;
responsive to determining that the second sequence of characters comprises a time reference, convert the memorandum stored in the first data structure of the first type into a calendar entry stored in a second data structure of a second type;
store, in the second data structure of the second type, an identifier of a time referenced by the time reference;
store, in the second data structure, an identifier of an event and an identifier of a location of the event, wherein the identifier of the location is provided by a reference to a record in an office space management system;
parse the second sequence of characters to produce a data item representing a type identifier of the calendar entry, wherein the type identifier is provided by one of: an appointment, a meeting request, or a reminder; and
render at least part of the first data structure and at least part of the second data structure in a mixed view showing calendar entries and memorandums.

19. A computer-readable non-transitory storage medium comprising executable instructions that, when executed by a computer system, cause the computer system to:
receive, by an image capturing device of the computer system, an input image, wherein the image capturing device is provided by one of: a still image camera or a video camera;
process the input image to produce a first sequence of characters of a natural language, wherein the natural language is specified by a configuration parameter of the computer system;
responsive to determining that the first sequence of characters comprises no time references, store, in a first data structure of a first type, a memorandum comprising at least part of the first sequence of characters;
receive a user input modifying the memorandum;
process the user input to produce a second sequence of characters;
responsive to determining that the sequence of characters comprises an imprecise relative time reference, convert the memorandum stored in the first data structure of the first type into a calendar entry stored in a second data structure of a second type;
convert, by applying one or more pre-defined conversion rules, the imprecise relative time reference into an absolute time reference;
store, in a second data structure of a second type, the calendar entry comprising an identifier of a time referenced by the absolute time reference;
store, in the second data structure, an identifier of an event and an identifier of a location of the event, wherein the identifier of the location is provided by a reference to a record in an office space management system;
parse the second sequence of characters to produce a data item representing a type identifier of the calendar entry, wherein the type identifier is provided by one of: an appointment, a meeting request, or a reminder; and
render at least part of the first data structure and at least part of the second data structure in a mixed view showing calendar entries and memorandums.

20. The computer-readable non-transitory storage medium of claim 19, further comprising executable instructions causing the computer system to:
store a pointer to an attachment in at least one of: the first data structure or the second data structure.

* * * * *